US007870391B2

(12) United States Patent
Kang et al.

(10) Patent No.: US 7,870,391 B2
(45) Date of Patent: Jan. 11, 2011

(54) METHOD OF MANAGING MULTIMEDIA DATA AND MOBILE COMMUNICATION TERMINAL EQUIPPED WITH FUNCTION OF MANAGING MULTIMEDIA DATA

(75) Inventors: Jung-mook Kang, Seoul (KR); Su-hyun Yim, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1432 days.

(21) Appl. No.: 11/298,284

(22) Filed: Dec. 9, 2005

(65) Prior Publication Data

US 2006/0126805 A1    Jun. 15, 2006

(30) Foreign Application Priority Data

Dec. 15, 2004    (KR)    ........... 10-2004-0106554

(51) Int. Cl.
*H04L 9/32* (2006.01)
(52) U.S. Cl. .................. 713/176; 713/181
(58) Field of Classification Search .......... 713/176, 713/193; 379/88.13
See application file for complete search history.

(56) References Cited

U.S. PATENT DOCUMENTS

| 4,551,837 | A | * | 11/1985 | Goegelein et al. ........... 714/732 |
| 5,159,633 | A | * | 10/1992 | Nakamura ................... 380/30 |
| 6,470,329 | B1 | * | 10/2002 | Livschitz ........................ 1/1 |
| 6,636,873 | B1 | * | 10/2003 | Carini et al. ..................... 1/1 |
| 6,976,053 | B1 | * | 12/2005 | Tripp et al. ................. 709/202 |
| 7,003,672 | B2 | * | 2/2006 | Angelo et al. .............. 713/189 |
| 7,434,065 | B2 | * | 10/2008 | Rodgers et al. ............. 713/189 |
| 2002/0046296 | A1 | * | 4/2002 | Kloba et al. ................ 709/248 |
| 2004/0063449 | A1 | * | 4/2004 | Fostick ......................... 455/517 |
| 2005/0071639 | A1 | * | 3/2005 | Rodgers et al. ............. 713/176 |
| 2005/0278499 | A1 | * | 12/2005 | Durham et al. ............. 711/173 |
| 2006/0064470 | A1 | * | 3/2006 | Sargent et al. ............. 709/219 |
| 2009/0037726 | A1 | * | 2/2009 | Rodgers et al. ............. 713/155 |

OTHER PUBLICATIONS

IEEE, 2003, "ISSCC 2003/Session 2/" Multimedia Signal Processing/ Paper 2.3, Retrieved date Mar. 20, 2010.*

* cited by examiner

*Primary Examiner*—Gilberto Barron, Jr.
*Assistant Examiner*—Samson B Lemma
(74) *Attorney, Agent, or Firm*—H.C. Park & Associates, PLC

(57) ABSTRACT

A mobile communication terminal having a function of managing multimedia data is provided, including: a main memory including a multimedia database storing the multimedia data; a signal processor converting the multimedia data stored in the main memory into data of a format suitable to be output to a display of the mobile communication terminal; a back_end chip which processes the multimedia data outputted from the signal processor, stores digest information of multimedia data upon occurrence of an update event of the multimedia data, and provides the stored digest information upon receiving a signal of requesting the digest information to be synchronized; and a front_end chip including a controller which requests the digest information stored in the back_end chip, compares and synchronizes the digest information offered from the back_end chip and digest information stored in advance in the front_end chip.

11 Claims, 2 Drawing Sheets

METHOD OF MANAGING MULTIMEDIA DATA AND MOBILE COMMUNICATION TERMINAL EQUIPPED WITH FUNCTION OF MANAGING MULTIMEDIA DATA

This application claims the priority of Korean Patent Application No. 2004-0106554, filed on Dec. 15, 2004, in the Korean Intellectual Property Office, the disclosure of which is incorporated herein in its entirety by reference.

BACKGROUND OF THE INVENTION

1. Field of the Invention

The present invention relates to a mobile communication terminal and, more particularly, to a technology of storing digest information of multimedia data both in a front_end chip and in a back_end chip of the mobile communication terminal and synchronizing the digest information between both of the chips.

2. Description of Related Art

In recent years, mobile communication terminals equipped with various functions are increasingly becoming popular. For instance, most of the mobile communication terminals currently released are equipped with a camera function. Moreover, mobile communication terminals equipped with a TV viewing function have been recently put on the market. With such a trend, the mobile communication terminals have become more than just devices for communications; they now function as multimedia devices. Users transfer music files, send photos, and surf the web much more frequently than before.

Meanwhile, a mobile communication terminal includes a back_end chip which is responsible for processing multimedia data. The back_end processes YUV-format data outputted from an image signal processor (ISP), which processes multimedia data inputted through a camera or offered from a mobile carrier, and outputs it to a liquid crystal display (LCD) of the mobile communication terminal. Examples of the back_end chip include a mobile station modem (MSM) or a digital signal processor (DSP).

However, conventionally, only any one of the front_end and back_end chips stores digest information of multimedia data inputted through a camera or offered from a mobile carrier. As a result, when frequent message exchange between both of the chips takes place to output the multimedia data, a processing speed of the mobile communication terminal may be reduced. In addition, there is a problem in that when any data is destroyed in a chip storing the multimedia data, users cannot use the data any more.

SUMMARY OF THE INVENTION

The present invention provides a method of managing multimedia data and a mobile communication terminal equipped with a function of managing the multimedia data so that overload imposed on the mobile communication terminal due to frequent message exchange between a front_end chip and a back_end chip can be prevented.

The present invention also provides a method of managing multimedia data and a mobile communication terminal equipped with a function of managing the multimedia data so that it is possible to prevent content from being unavailable due to a loss of information on multimedia data stored in a chip of the mobile communication terminal.

According to an aspect of the present invention, there is provided a mobile communication terminal having a function of managing multimedia data, including: a main memory having a multimedia database storing the multimedia data; a signal processor converting the multimedia data stored in the main memory into data of a format suitable to be output to a display of the mobile communication terminal; a back_end chip which processes the multimedia data outputted from the signal processor, stores digest information of multimedia data upon occurrence of an update event of the multimedia data, and provides the stored digest information upon receiving a signal of requesting the digest information to be synchronized; and a front_end chip including a controller which controls the mobile communication terminal, requests the digest information stored in the back_end chip, compares and synchronizes the digest information offered from the back_end chip and digest information stored in advance in the front_end chip.

The mobile communication terminal may further include a camera unit converting a light signal inputted via a lens system into an electrical image signal.

The back_end chip may include: a multimedia processor processing the multimedia data outputted from the signal processor and outputting the processed multimedia data to a display of the mobile communication terminal; a first encryptor extracting and encrypting digest information of multimedia data which is outputted in real time from the camera unit or a wireless communication unit or is stored in the main memory; a first sub-memory storing the digest information outputted from the first encryptor; and a digest information processor which provides the digest information stored in the first encryptor upon occurrence of a synchronization event and updates the first sub-memory when the digest information is updated.

The controller may include: a second encryptor extracting and encrypting digest information of multimedia data which is outputted in real time from the camera unit or a wireless communication unit or is stored in the main memory; a second sub-memory storing the digest information of multimedia data encrypted by the second encryptor; and a digest information synchronization unit comparing and synchronizing digest information of multimedia data received or collected from the digest information processor and digest information of multimedia data stored in the second sub-memory.

According to another aspect of the present invention, there is provided a method of managing multimedia data in a mobile communication terminal, the method including the operations of: encrypting and storing digest information of multimedia data in a front_end chip and a back_end chip upon occurrence of an update event of the multimedia data; requesting digest information of multimedia data stored in the back_end chip; and comparing and synchronizing digest information of multimedia data provided from the back_end chip and digest information of multimedia data stored in advance in the front_end chip.

The front_end chip and the back_end chip may authenticate digest information of multimedia data between the two chips using an MD5 (message digest 5) algorithm.

The front_end chip and the back_end chip may synchronize updated digest information of multimedia data when the digest information of multimedia data is updated.

The front_end chip and the back_end chip may synchronize digest information of multimedia data updated at predetermined time periods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
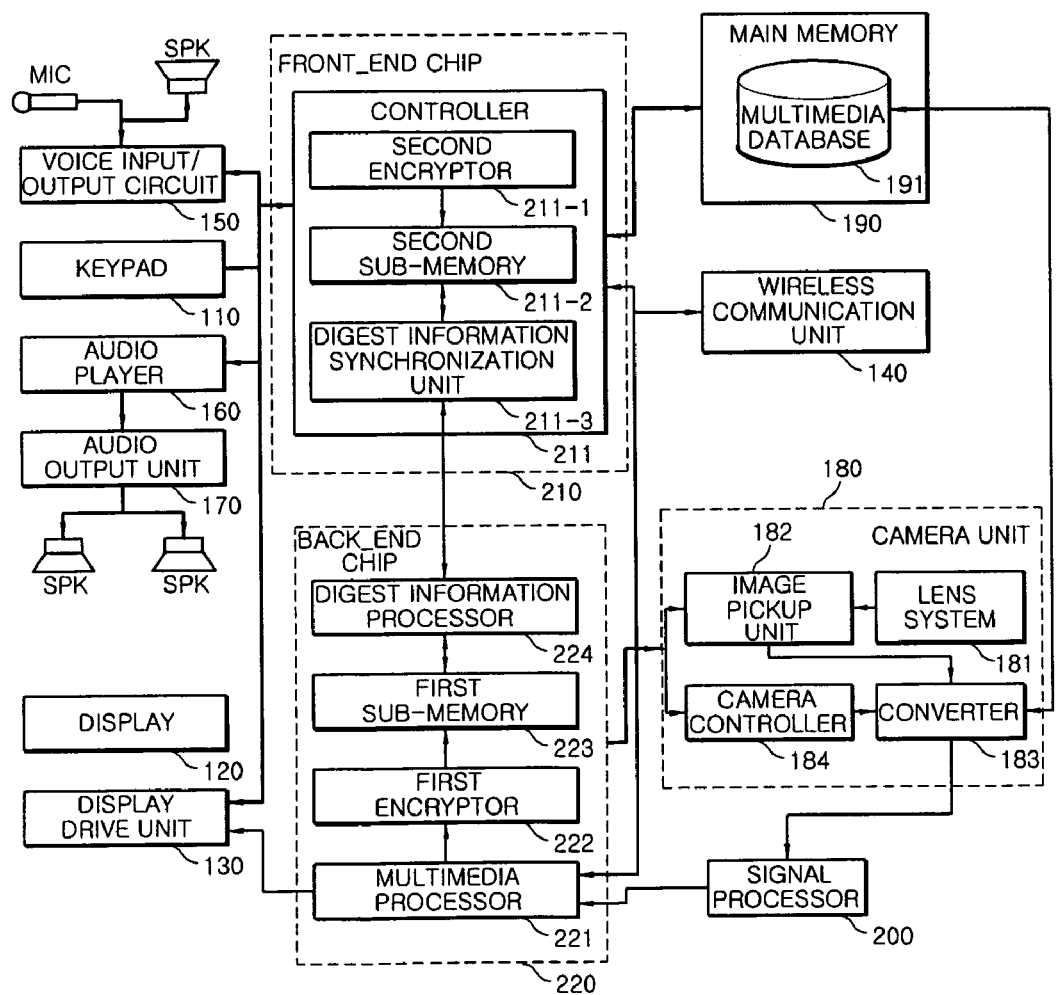
FIG. 1 is a block diagram of a mobile communication terminal equipped with a function of managing multimedia data in accordance with an embodiment of the present invention.

FIG. 1 is a block diagram of a mobile communication terminal equipped with a multimedia data management function in accordance with an embodiment of the present invention. The mobile communication terminal includes a main memory 190 having a multimedia database 191 storing multimedia data, a signal processor 200 converting the multimedia data into data of a format suitable to be output to a display of the mobile communication terminal, a front_end chip 210 including a controller 211, a back_end chip 220 processing the multimedia data outputted from the signal processor 200, and other components commonly used in typical mobile communication terminals.

The components commonly used in typical mobile communication terminals include a keypad 110, a display 120 displaying menu and operating states, a display drive unit 130 outputting graphic data to the display 120, a wireless communication unit 140 extracting data signals including voice and multimedia data from wireless signals transmitted/received via an antenna, a voice input/output circuit 150 inputting/outputting voice signals received from the wireless communication unit 140 via a microphone and a speaker, an audio player 160, and an audio output unit 170.

The keypad 110 and the display 120 which is typically a liquid crystal display (LCD) have typical configurations. The display drive unit 130 outputs display data including graphic data outputted via the display 120 and backlight control signals.

The wireless communication unit 140 includes an antenna and a radio frequency (RF) circuit to communicate with base stations. The wireless communication unit 140 is construed to cover existing mobile communication systems, such as CDMA, GSM, and W-CDMA, and mobile communication systems to appear in the future. The voice input/output circuit 150 converts digital voice data to analog voice signals and vice versa. The voice input/output circuit 150 has a well-known configuration including a filter or an audio amplifier amplifying voice signals inputted/outputted according to a control signal of the controller 211.

A baseband circuit of the wireless communication unit 140 and most circuits of the controller 211 are integrated into a commercially available single chip. This IC chip, which is usually called a mobile station modem (MSM) chip, includes dedicated hardware for communication processing, a digital signal processor, and a general-purpose microprocessor. They control voice and data communications and also control the entire system according to operating states or signals inputted from the keypad 110.

The audio player 160 includes, for example, a sound source reproduction chip, such as Yamaha chip, or a DSP chip for MP3 reproduction, and plays back and outputs bell sounds, effect sounds, music files or the like to the audio output unit 170. The audio output unit 170 amplifies and outputs various sounds such as bell sounds, effect sounds, or music files played back from the audio player 160 according to a control signal outputted from the controller 211.

The main memory 190 includes a RAM area temporarily storing data generated during control of the mobile communication terminal, a ROM area storing a control program for controlling the mobile communication terminal, and a data area storing a user interface (U/I) or a user application and data created by the user application, which are offered by the mobile communication terminal. The main memory 190 is controlled by the controller 211.

Also, the main memory 190 includes a multimedia database 191 storing multimedia data received via the wireless communication unit 140 and various interfaces or multimedia data outputted from a camera unit 180. The multimedia database 191 stores multimedia data outputted from the wireless communication unit 140 or the camera unit 180. The multimedia data is accessed by the controller 211.

The mobile communication terminal may further include a camera unit 180 for converting a light signal inputted from a lens system to an electrical image signal. The front_end chip 210 and the back_end chip 220 synchronize digest information obtained from multimedia data such as moving images and image data outputted from the camera unit 180. The camera unit 180 includes a lens system 181, an image pickup unit 182 converting a light signal outputted from the lens system 181 to an analog electrical signal, a converter 183 converting the signal outputted from the image pickup unit 182 to a digital signal and then transforming it to a signal of a format suitable to be input to the signal processor 200, and a camera controller 184 controlling the operation of the camera unit 180.

The lens system 181, which includes one or more small lenses, condenses light and then supplies the light to the image pickup unit 182. The image pickup unit 182 typically includes a CMOS image pickup device or a CCD image pickup device. The image pickup unit 182 converts light into electrical signals in each cell and sequentially outputs them in synchronization with clocks. The converter 183 converts a current or a voltage proportional to the brightness of an image outputted from the image pickup unit 182 into digital data, and then converts the data to YUV-format data. The converter 183 may further include a codec which compresses images into JPEG-format or MPEG-format data as in a typical camera module.

The signal processor 200 processes multimedia data, which is outputted from the wireless communication unit 140 or the camera unit 180, or is stored in the main memory 190, according to a control signal of the controller 211, and converts it to data of a format suitable to be output to the display 120. The signal processor 200 has been developed by the present applicant for use in a camera phone. The signal processor 200 can be used for the camera unit 180 with no change in its structure.

The back_end chip 220 includes a multimedia processor 221 which processes multimedia data outputted from the signal processor 200 and outputs it to the display 120, a first encryptor 222 which extracts and encrypts digest information of multimedia data stored in the main memory 190, a first sub-memory 223 which stores the digest information of the multimedia data outputted from the first encryptor 222, and a digest information processor 224 which provides the digest information stored in the first sub-memory 223 upon occurrence of a synchronization event and updates the digest information stored in the first sub-memory 223 upon updating of the multimedia data.

The multimedia processor 221 outputs multimedia data outputted from the signal processor 200 to the display 120. For example, when moving images and pictures are taken through the camera unit 180, an image sensor outputs raw Bayer RGB format data according to an image pickup signal generated from light entering through a lens system. The signal processor 200 (ISP: image signal processor) receives and converts it to actual RGB-format multimedia data.

The RGB-format multimedia data is converted to YUV-format data suitable for the multimedia processor 221 of the back_end chip 220, i.e., YUV-format data suitable to be output to the display of the mobile communication terminal. The multimedia processor 221 of the back_end chip 220 processes the received YUV-format moving images and outputs it to the display 120.

The first encryptor 222 encrypts multimedia data stored in the main memory 190 into 128-bit digest information using an MD5 (message digest 5) algorithm and stores it in the first sub-memory 223. The MD5 algorithm is specified in Internet Engineering Task Force (IETF) Requests for Comments (RFC) 1321, which will be described in detail below. The first sub-memory 223 is a small-capacity memory, such as a cache memory. The first sub-memory 223 stores digest information outputted from the first encryptor 222. The digest information of the multimedia data is provided to the front_end chip through the digest information processor 224 and is updated upon synchronization.

The digest information processor 224, for example, provides the multimedia digest information stored in the first sub-memory 223 to the front_end chip 210 upon booting of the mobile communication terminal or upon occurrence of a synchronization event such as storing, modifying or deleting multimedia data in the main memory 190. That is, the digest information of multimedia data stored in the back_end chip 220 and the digest information of multimedia data stored in the front_end chip 210 are compared with each other to determine the effectiveness of the information, and then digest information of multimedia data stored in a chip determined to be incorrect is modified into digest information of multimedia data stored in a chip determined to be correct, thereby synchronizing the digest information between both of the chips.

The front_end chip 210 includes a controller 211 controlling the mobile communication terminal. The controller 211 includes a second encryptor 211-1 which encrypts digest information of multimedia data stored in the multimedia database 191 of the main memory 190, a second sub-memory 211-2 which stores the multimedia digest information encrypted by the second encryptor 211-1, and a digest information synchronization unit 211-3 which compares and synchronizes multimedia digest information received from the digest information processor 224 and multimedia digest information stored in advance in the second sub-memory 211-2.

The second encryptor 211-1 encrypts multimedia data stored in the main memory 190 into 128-bit digest information using the MD5 algorithm and stores it in the second sub-memory 211-2. The second sub-memory 211-2 is a small-capacity memory mounted on the front_end chip 210, such as a cache memory. The second sub-memory 211-2 stores digest information outputted from the second encryptor 211-1.

The digest information synchronization unit 211-3, for example, receives and collects the multimedia digest information stored in the back_end chip 220 upon booting of the mobile communication terminal or upon occurrence of a synchronization event such as adding, modifying or deleting multimedia data, and synchronizes the digest information between the two chips. After the multimedia digest information stored in the back_end chip 220 is provided to the front_end chip 210 at the request of the digest information synchronization unit 211-3, or is accessed directly by the digest information synchronization unit 211-3 of the front_end chip 210, it is compared with the multimedia digest information stored in the front_end chip 210.

The digest information synchronization unit 211-3 compares the multimedia digest information stored in the back_end chip 220 with the multimedia digest information stored in the front_end chip 210 to determine the effectiveness of the digest information, and modifies digest information of multimedia data stored in a chip determined to be incorrect into digest information of multimedia data stored in a chip determined to be correct, thereby synchronizing the digest information between both of the chips.

The back_end chip 220 and the front_end chip 210 of the mobile communication terminal according to the present invention use the MD5 algorithm to authenticate messages exchanged between the two chips. The MD5 algorithm is used to verify data integrity through the creation of a 128-bit message digest from data input. The MD5 algorithm is an extension of MD4, which was developed by Professor Ronald L. Rivest, and is based on a hash function designed for fast execution of software.

To use the hash functions efficiently for the purpose of message authentication, measures should be taken against 'inversion', 'collision', and 'forgery'. The term 'inversion' implies that a message is found from a given hash value. The term 'collision' implies that two or more different messages have the same hash value. The term 'forgery' implies that a message authentication code is calculated with no knowledge of cipher and key. The hash function converts a message of any length to a hash value of a fixed length.

The mobile communication terminal according to the present invention synchronizes the time when multimedia data is updated, for example, when the multimedia data is added, modified, or deleted, or the digest information of the multimedia data. For example, when a user takes moving images and pictures through the camera unit 180, multimedia data created from the moving images and pictures is displayed in the display 120 through the signal processor 200 and the back_end chip 220, and is stored in the multimedia database 191 of the main memory 190.

The first encryptor 222 of the back_end chip 220 converts the multimedia data stored in the main memory 190 to 128-bit digest information using the MD5 algorithm and stores it in the first sub-memory 223. After the data created from the moving images and pictures taken by the camera unit 180 is stored, the digest information synchronization unit 211-3 of the front_end chip 210 requests the digest information processor 224 of the back_end chip 220 to offer the multimedia digest information stored in the first sub-memory 223 of the back_end chip 220. The digest information processor 224 transmits the multimedia digest information stored in the first sub-memory 223 to the digest information synchronization unit 211-3.

The digest information synchronization unit 211-3 compares multimedia digest information stored in the first sub-memory 223 with multimedia digest information stored in the second sub-memory 211-2 to determine the effectiveness of the information, and modifies digest information of multimedia data stored in a chip determined to be incorrect into digest information of multimedia data stored in a chip determined to be correct, thereby synchronizing the digest information between both of the chips. That is, when the first sub-memory 223 of the back_end chip 220 stores digest information of 'A' while the second sub-memory 211-2 of the front_end chip 210 does not stores the digest information of 'A', the digest information synchronization unit 211-3 updates the second sub-memory 211-2 of the front_end chip 210 to store the digest information of 'A'.

Additionally, the front_end chip 210 and the back_end chip 220 of the mobile communication terminal can synchronize multimedia digest information updated at predetermined time periods. The synchronization time period of the digest information is set by an operating program of the mobile communication terminal. The operating program transmits a control signal to the digest information synchronization unit 211-3 of the front_end chip 210 at predetermined time periods. The digest information synchronization unit 211-3 of the front_end chip 210 receives the control signal transmitted at predetermined time periods and requests the digest information processor 224 of the back_end chip 220 to offer the digest information for synchronization of the digest information between the two chips. As a result, it is possible to prevent overload imposed on the mobile communication terminal due to frequent synchronization.

Figure 2:
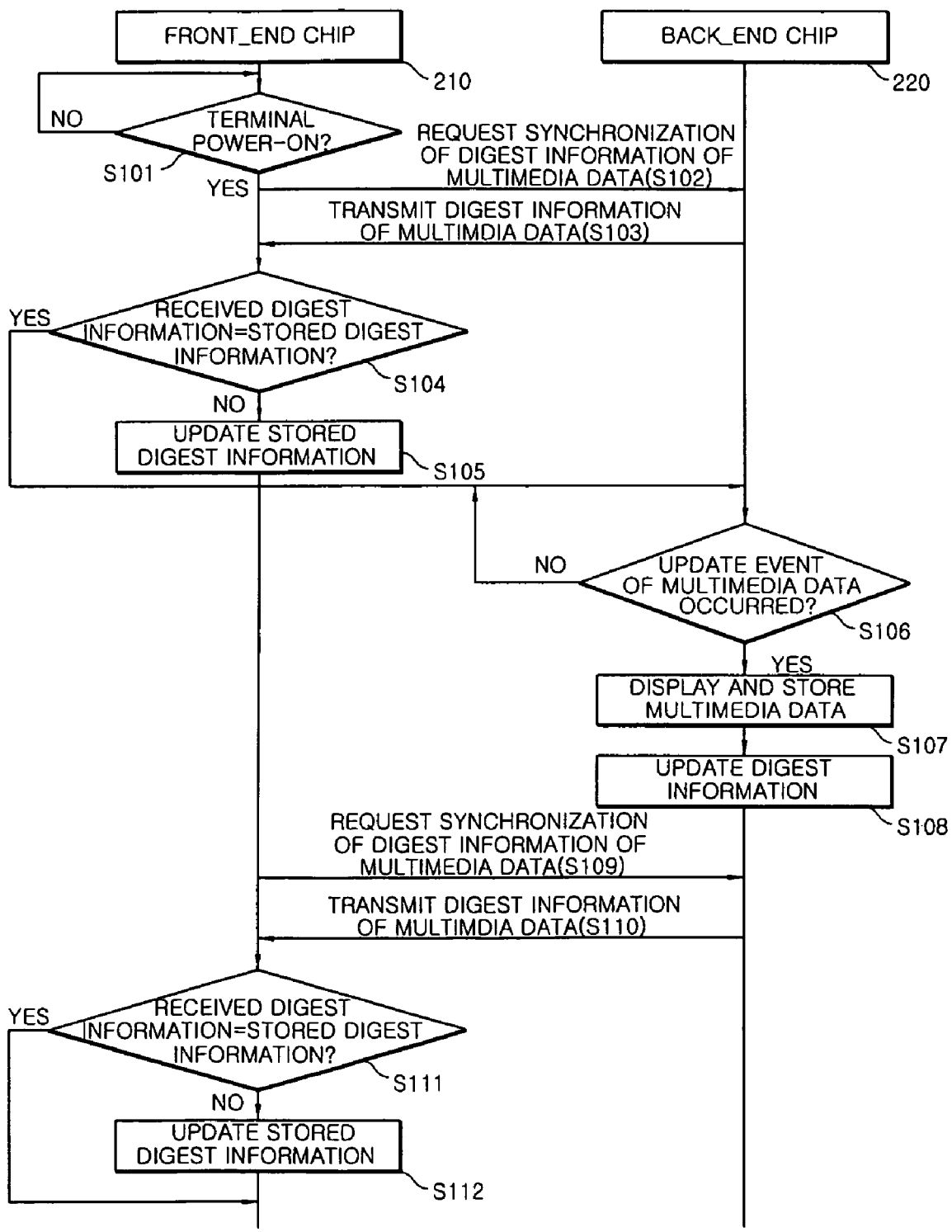
FIG. 2 is a flow chart of a process of managing multimedia data in a mobile communication terminal in accordance with another embodiment of the present invention.

FIG. 2 is a flow chart of a synchronization process of multimedia data implemented in a mobile communication terminal according to an embodiment of the present invention. According to the synchronization process of multimedia data, when a user presses a power-on button of the mobile communication terminal, the controller 211 of the front_end chip 210 accesses a terminal operating program stored in the memory 190 (S101).

The digest information synchronization unit 211-3 of the controller 211 requests the digest information processor 224 of the back_end chip 220 to offer digest information of multimedia data stored in the first sub-memory 223 for synchronization of the multimedia digest information with the back_end chip 220 (S102). The digest information processor 224 accesses and sends the digest information of multimedia data stored in the first sub-memory 223 to the digest information synchronization unit 211-3 of the front_end chip 210 (S103). The digest information synchronization unit 211-3 accesses and compares the digest information of the multimedia data stored in the second sub-memory 211-2 of the front_end chip 210 with the digest information of the back_end chip 220 sent from the digest information processor 224 to determine the effectiveness of the information. The effectiveness is determined according to whether or not the multimedia digest information stored in the two chips are matched with each other. If matched, the digest information synchronization unit 211-3 terminates the synchronization process (S104).

If the effectiveness between the two chips is computationally infeasible, i.e., if there exist different digest information among a plurality of digest information, the respective digest information are synchronized to secure data integrity. For example, when the first sub-memory 223 of the back_end chip 220 stores digest information of 'A' while the second sub-memory 211-2 of the front_end chip 210 does not stores the digest information of 'A', the digest information synchronization unit 211-3 updates the second sub-memory 211-2 of the front_end chip 210 to store the digest information of 'A' (S105).

When the multimedia data stored in the main memory 190 is updated (S106), e.g., when a user takes and stores moving images or pictures using the camera unit 180 mounted on the mobile communication terminal or when a user downloads multimedia data offered by a mobile carrier or the like, the back_end chip 220 displays multimedia data, which is output from the camera unit 180 or the wireless communication unit 140 and an external interface incorporated in the mobile communication terminal and is input through the signal processor 200, on the display 120 and stores it in the main memory 190 (S107).

The first encryptor 222 of the back_end chip 220 encrypts the multimedia data into 128-bit digest information using the MD5 algorithm and stores it in the first sub-memory 223 (S108). For example, after multimedia data such as moving images or pictures taken by the camera unit 180 is stored, the digest information synchronization unit 211-3 of the front_end chip 210 requests the digest information processor 224 of the back_end chip 220 to offer a plurality of multimedia digest information stored in the first sub-memory 223 of the back_end chip 220 (S109). The digest information processor 224 sends the multimedia digest information stored in the first sub-memory 223 to the digest information synchronization unit 211-3 (S110).

The digest information synchronization unit 211-3 compares the multimedia digest information stored in the first sub-memory 223 with the multimedia digest information of the second sub-memory 211-2, and retrieves digest information of multimedia data taken by the camera unit 180. The digest information synchronization unit 211-3 receives the retrieved digest information from the back_end chip 220 and stores it in the second sub-memory 211-2 of the front_end chip 210, thereby synchronizing digest information between the two chips (S111 and S112).

In addition, the front_end chip 210 and the back_end chip 220 of the mobile communication terminal according to the present invention can synchronize multimedia digest information updated at predetermined time periods, thereby preventing overload imposed on the mobile communication terminal due to frequent synchronization.

As apparent from the above description, a method of managing multimedia data and a mobile communication terminal using the method according to the present invention creates digest information from the multimedia data stored in a main memory using a digest algorithm, stores the created digest information both in a front_end chip and in a back_end chip, and synchronizes the digest information between the two chips, thereby preventing overload imposed on the mobile communication terminal due to increased message exchange between the front_end chip and the back_end chip.

In addition, since both chips store multimedia digest information, data recovery is possible when data is destroyed and it is easy to manage information of the entire system.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal having a function of managing multimedia data, comprising:
   a main memory including a multimedia database to store the multimedia data;

a signal processor to convert the multimedia data stored in the main memory into data of a format suitable to be output to a display of the mobile communication terminal;

a back_end chip which processes the multimedia data outputted from the signal processor, stores digest information of multimedia data in a first sub-memory upon occurrence of an update event of the multimedia data, and provides the stored digest information upon receiving a signal of requesting the digest information to be synchronized; and a front_end chip including a controller which controls the mobile communication terminal, requests the digest information stored in the first sub-memory of the back_end chip, compares and synchronizes the digest information offered from the back_end chip and digest information stored in advance in a second sub-memory of the front_end chip, wherein the front_end chip updates the second sub-memory to store the digest information offered from the back_end chip if the digest information offered from the back_end chip is different from the digest information stored in advance in the second sub-memory.

2. The mobile communication terminal of claim 1, further comprising a camera unit to convert a light signal inputted via a lens system into an electrical image signal.

3. The mobile communication terminal of claim 2, wherein the back_end chip comprises:

a multimedia processor to process the multimedia data outputted from the signal processor and to output the processed multimedia data to a display of the mobile communication terminal;

a first encryptor to extract and encrypt digest information of multimedia data which is outputted in real time from the camera unit or a wireless communication unit or is stored in the main memory;

the first sub-memory to store the digest information outputted from the first encryptor; and a digest information processor which provides the digest information stored in the first encryptor upon occurrence of a synchronization event and updates the first sub-memory when the digest information is updated.

4. The mobile communication terminal of claim 3, wherein the controller comprises:

a second encryptor to extract and encrypt digest information of multimedia data which is outputted in real time from the camera unit or a wireless communication unit or is stored in the main memory;

the second sub-memory to store the digest information of multimedia data encrypted by the second encryptor; and a digest information synchronization unit to compare and synchronize digest information of multimedia data received or collected from the digest information processor and digest information of multimedia data stored in the second sub-memory.

5. The mobile communication terminal of claim 4, wherein the front_end chip and the back_end chip authenticate digest information of multimedia data between the two chips using an MD5 (message digest 5) algorithm.

6. The mobile communication terminal of claim 5, wherein the front_end chip and the back_end chip synchronize updated digest information of multimedia data when the digest information of multimedia data is updated.

7. The mobile communication terminal of claim 5, wherein the front_end chip and the back_end chip synchronize digest information of multimedia data updated at predetermined time periods.

8. A method of managing multimedia data in a mobile communication terminal, the method comprising the operations of:

encrypting and storing digest information of multimedia data in a front_end chip and a back_end chip upon occurrence of an update event of the multimedia data;

requesting digest information of multimedia data stored in the back_end chip; and comparing and synchronizing digest information of multimedia data provided from the back_end chip and digest information of multimedia data stored in advance in the front_end chip, wherein synchronizing digest information comprises updating a sub-memory of the front_end chip to store the digest information provided from the back_end chip if the digest information provided from the back_end chip is different from the digest information of multimedia data stored in advance in the front_end chip.

9. The method of claim 8, wherein the front_end chip and the back_end chip authenticate digest information of multimedia data between the two chips using the MD5 algorithm.

10. The method of claim 9, wherein the front_end chip and the back_end chip synchronize updated digest information of multimedia data when the digest information of multimedia data is updated.

11. The method of claim 9, wherein the front_end chip and the back_end chip synchronize digest information of multimedia data updated at predetermined time periods.

* * * * *